United States Patent [19]
Dunson, Jr.

[11] Patent Number: 5,137,687
[45] Date of Patent: Aug. 11, 1992

[54] PROCESS FOR ODOR CONTROL

[75] Inventor: James B. Dunson, Jr., Newark, Del.

[73] Assignee: E. I. du Pont de Nemours and Company, Wilmington, Del.

[21] Appl. No.: 747,058

[22] Filed: Aug. 19, 1991

Related U.S. Application Data

[63] Continuation-in-part of Ser. No. 406,480, Sep. 15, 1989, Pat. No. 5,071,622.

[51] Int. Cl.$^5$ .......................... A61L 9/00; A61L 11/00
[52] U.S. Cl. ............................................ 422/5; 422/1; 424/76.5; 424/76.6; 424/76.7; 210/916
[58] Field of Search ...................... 422/1, 5; 210/916; 424/76.5, 76.6, 76.7

[56] References Cited

U.S. PATENT DOCUMENTS

| | | | |
|---|---|---|---|
| 3,703,472 | 11/1971 | Shaw et al. | 252/107 |
| 4,230,478 | 10/1986 | Zumbrunn | 71/3 |

FOREIGN PATENT DOCUMENTS

| | | | |
|---|---|---|---|
| 3323753 | 1/1985 | Fed. Rep. of Germany. | |
| 61-090799 | 5/1986 | Japan. | |
| 62-247889 | 10/1987 | Japan. | |
| 3016092 | 1/1988 | Japan | 422/5 |
| 63-05200 | 3/1988 | Japan. | |
| 1011554 | 1/1989 | Japan | 424/76.5 |

Primary Examiner—Robert J. Warden
Assistant Examiner—Stephanie Blythe
Attorney, Agent, or Firm—David J. Gould

[57] ABSTRACT

This invention relates to a process for reducing odor perceived by a nearby community from an odor-emitting system, e.g., sewage treatment, etc., by adsorbing on core particles, as described, condensible components present in the system. The malodorous components then cannot adsorb in a film of condensible components on the aerosol to be carried by the aerosol plume into the surrounding community, but remain with the humid gas plume to be dispersed upward into the atmosphere. The process is useful for any system which contains condensible components and malodorous components and whose emissions form aerosols.

5 Claims, 2 Drawing Sheets

PROCESS FOR ODOR CONTROL

Ths application is a continuation-in-part of and priority is claimed to copending U.S. application No. 07/406,480, now U.S. Pat. No. 5,071,622 filed Sep. 15, 1989.

TECHNICAL FIELD

This invention relates to an improved process for controlling perceived odors. More particularly this invention relates to a process for substantially reducing the effect of malodorous components in systems emitting aerosols by attaching condensible components in the system onto core particles rather than allowing the condensible components to become coated on the aerosols.

BACKGROUND OF THE INVENTION

The urbanization of America has resulted in a rapidly decreasing level of tolerance for offensive odors. Industries and municipalities have had to apply more and more sophisticated odor abatement treatment to avoid fines and orders to restrict operations based on complaints from the local community about nuisance odors.

Human wastes that were once simply deposited near the source dwelling are now carried away underground in a dilute aqueous stream from which the solids are removed by settling and the soluble nutrients are removed by biological action before the water is returned to the environment for re-use. In the recent past, the sludge remaining after primary and secondary treatment was disposed of by burial or by dumping at sea, but it must now be further treated to eliminate potentially hazardous organisms and odor.

Industries such as rendering, tanning, oil meal processing, manure drying, chemical manufacturing, paper manufacture, petroleum refining, especially those that involve both hydrophobic compounds and hot, humid gases, have odor problems that do not respond well to conventional odor abatement treatment.

Conventional odor abatement technology has been based on the premise that the main chemicals responsible for odor problems are either amines or sulfides. Amines are typically caught by scrubbing with sulfuric acid, while sulfides are typically caught by scrubbing with sodium hypochlorite. These processes have worked well enough often enough to become the predominant methods for odor abatement, but there have always been some difficult malodorous emissions for which conventional technology does not work consistently. [See "Odor Control", in "The Bio-Cycle Guide to Composting Municipal Wastes", The JG Press, Emmaus, PA, pages 35–43, 1989.]

In some cases, activated carbon can be used to adsorb difficult malodorous vapors from relatively dry gases, but it does not work well with gas streams above about 70% relative humidity. Activated carbon is expensive, and the spent adsorbent is not easily regenerated or disposed of.

As indicated above, conventional odor abatement processes attack the emitted odor directly. This is true in the cases of removing odorous amines and sulfides by scrubbing operations and difficult malodorous vapors by activated carbon. In many systems which emit malodorous components, including sewage treatment, not all emissions are of malodorous character. In fact, concentrations of relatively nonodorous organic compounds (many of which are condensible), are high compared with those of malodorous components. Conventional odor abatement treatments which attack the odor have largely ignored these organic compounds because they have inherently mild odors. The condensible components, however, are important to odor migration because they trap malodorous components on small droplets or particles, e.g., aerosol, which disperse into the atmosphere much less readily than gases.

Those skilled in the art have not recognized that relatively nonodorous components, e.g., from nominally inert bulking agents such as wood chips, sawdust, etc., may also make a significant contribution to odor problems. When emissions from such components are treated with conventional acid and bleach treatment the odor problem may become worse because some relatively nonodorous materials may be converted into compounds with undesirable odors.

It has been found that the above disadvantages can be overcome by an improved process whereby the known, but previously ignored, relatively nonodorous condensible organic components from odor-emitting operations, including sewage treatment plants, can be captured by being adsorbed to the surface of core particles. The process, by reducing or eliminating the condensation of so-called "sticky" oils onto aerosol of poor dispersibility to which normally dispersible malodorous materials, e.g., organic amines, sulfides, etc., become attached, results in materially reducing the concentration of malodorous components carried into the nearby community and provides a new perspective concerning odor abatement.

SUMMARY OF THE INVENTION

In accordance with this invention there is provided a process for substantially reducing the odor perceived by the community of an aerosol emitted from an odor-emitting system, the system having malodorous, low-boiling, hydrophobic components and condensible, relatively nonmalodorous, high-boiling, hydrophobic components, and water, the process comprising (a) contacting the condensible, hydrophobic components of the odor-emitting system with core particles having substantially all their surfaces exposed on the exterior of the particles, whereby the condensible, hydrophobic components attach to the core particles substantially preventing the formation on the aerosol of a film of the condensible components which would entrap the malodorous components on said aerosol and thus be carried into the community, and (b) dispersing the residual malodorous components into the atmosphere.

BRIEF DESCRIPTION OF THE DRAWINGS

In the accompanying figures forming a material part of this disclosure wherein.

DEFINITIONS OF TERMS

Figure 1:
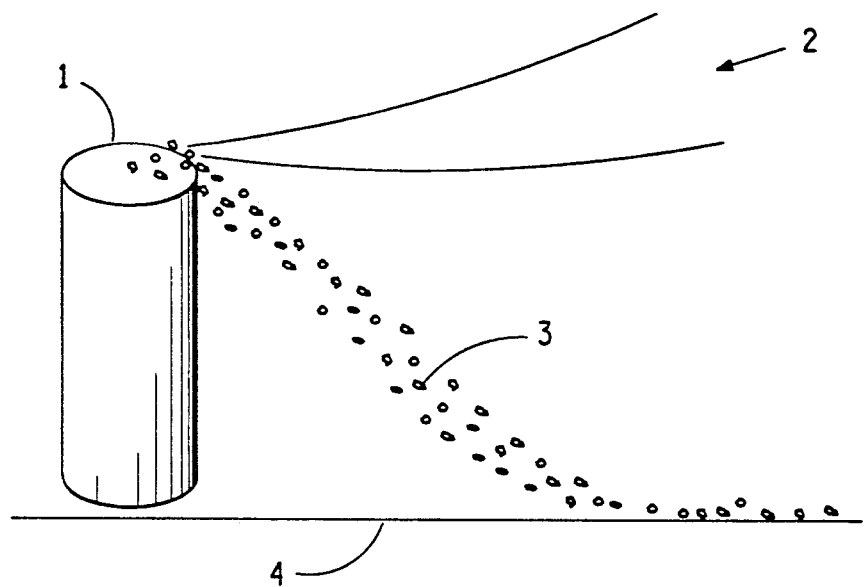
FIG. 1 is a schematic view showing the behavior of a humid gas plume and an aerosol plume leaving a malodorous system.

In the discussion that follows, the process of reducing perceived odors is expressed and exemplified in terms of treatment of sewage. It should be understood, however, that the process of the invention is also applicable to other systems that emit malodorous components.

Throughout the specification, the below-listed terms have the following meanings:

Emission means the humid gas/aerosol mixture that leaves the system after treatment. This can drift outside the plant site to cause odor complaints. In many instances the emission enters the atmosphere from a stack.

Humid Gas Plume means the gas portion of the gas-/aerosol emission, e.g., stack emission, including air parcels that diffuse into the plume after it leaves the point of emission, but not including the aerosol emitted from the system or formed by condensation after the plume leaves the point of emission.

Aerosol Plume means the aerosol portion of the emission plus the aerosol formed by condensation as the humid gas plume cools and water vapor and condensible components condense. The aerosol plume does not include the humid gas plume or other air parcels through which the aerosol falls after it leaves the point of emission or condenses.

Malodorous Components means compounds that are likely to result in odor complaints from an odor panel, people selected from the community near a system site, if the compounds are present in an odor test sample at concentrations commonly found in the emissions from the system site. These are generally volatile, hydrophobic materials, not readily soluble in water.

Volatile Components means materials whose concentrations in the emissions are normally below their saturation vapor pressure at 20° C. (ambient outside temperatures). These components do not condense by themselves to form an aerosol, but they can be adsorbed onto 1% a film of the condensible components. These components can also be referred to as "low-boilers".

Condensible Components means materials whose concentrations in the emissions are normally above their saturation vapor pressure at 20° C. (ambient outside temperatures). These components can condense by themselves to form an aerosol and can also condense on another aerosol (such as a water mist) to form a film in which volatile components can dissolve or be adsorbed. In sewage plant emissions, for example, these are generally hydrophobic materials that are not readily soluble in water and thus form films on the water when they condense. These components can also be referred to as "high-boilers" or "sticky oils".

Core Particles means particles that have substantially all their surface exposed on the exterior of the particle and have a mass-average minimum dimension between 0.01 and 10 micrometers, preferably 0.05 and 1 micrometer. The particles are insoluble in the system fluid, e.g., generally water. The particles may be formed in situ as a precipitate, e.g., the reaction product of two components added to the system.

Coupling Agent means an organic compound that reacts with or is strongly adsorbed on the core particles to form a coating that strongly adsorbs a condensible component. The coupling agent can a) modify the charge of the particle to be opposite to that of the condensible component, b) provide a chemical functionality that can react with the condensible, or c) modify the surface so that it has a strong adsorption affinity for the condensible component.

Spent Adsorbent means adsorbent (e.g., activated carbon, core particles, etc.) that has adsorbed so much adsorbate (e.g., condensible components, volatile components, etc.) that it is no longer effective as an adsorbing material. Spent adsorbent can be either discarded or regenerated for reuse.

DETAILED DESCRIPTION OF THE INVENTION

Aerosols, which may remain suspended for long periods of time due to thermal jostling from the gas molecules, can come from several different sources:

1. Small liquid droplets are formed when water vapor or other condensibles precipitate during cooling of warm gases containing water vapor or other condensible components.
2. Small liquid droplets are formed as gas bubbles rise to and break at the liquid surface.
3. Naturally-occurring dust or solid particles are taken in with the air or other gas drawn into the system.

The emission from the system is thus a warm, humid gas which may contain or later form an aerosol. As shown in FIG. 1 the humid gas/aerosol mixture 1 is discharged from a system, e.g., sewage treatment facility (not shown) via stack emission. Since the humid gas plume 2 is warm and humid, it has a lower density than cool, dry air, and tends to rise through and be rapidly mixed with the cooler, dryer air surrounding the region of discharge through both diffusion and turbulent mixing processes. This rapidly broadens and disperses the humid gas plume 2, and before it has travelled very far, the malodorous components present in the humid gas plume 2 have been diluted to concentrations below that at which they cause complaints by people living in the area.

The aerosol part of the humid gas/aerosol mixture 1, called an aerosol plume 3, in contrast to the humid gas plume tends to fall through the surrounding air and remain in a narrow path that drifts along near the ground 4 where any odor on the aerosol may be detected by the community near the site of emission. The aerosol plume 3 remains in a relatively narrow path because the aerosol particles are much larger than gas molecules and consequently diffuse more slowly. Being near ground level, the aerosol plume 3 is protected from wind turbulence that disperses the humid gas plume 2 into the surrounding air.

The droplets in the aerosol plume 3, e.g., aerosol droplets, may be formed by bubble breakup or other mechanical action at the liquid-gas interface in the system, in which case the droplets may have a film of insoluble material on their surface. Alternatively, the aerosol droplets may be formed or may grow larger as a result of condensation of water vapor or other condensible vapors. If these other condensible vapors are insoluble in the water, they will form a film on the water droplets.

Aerosol droplets diffuse more slowly than gas molecules, so that the aerosol plume 3 remains coherent and concentrated long after the humid gas plume 2 has dissipated. If the aerosol plume 3 contains malodorous components, people living near the site generating odorous emissions will perceive the odor.

Figure 2:
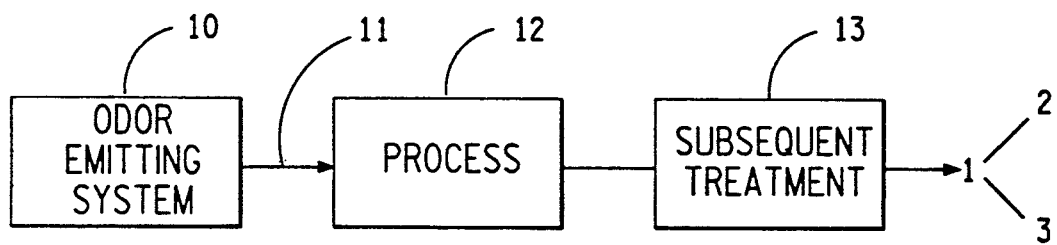
FIG. 2 is a schematic view showing the beneficial effect of the process of the invention on an odor-emitting system and subsequent treatment.

FIG. 2 illustrates beneficial effects achieved by the instant invention. An odor-emitting system 10 having malodorous emissions 11 is treated by the process 12 of the invention using core particles as described more fully below. The condensible components are largely removed by being adsorbed onto the core particles, resulting in reduced opportunity for the volatile malodorous components to be adsorbed on aerosol particles present in the emission after treatment by the process 12 of the invention.

Any subsequent treatment 13, e.g., scrubbing operation, can also be improved by the process of the invention 12. The presence of malodorous components is thereby reduced in both the humid gas plume 2 and the aerosol plume 3 of the humid gas/aerosol mixture 1. The beneficial effects achieved by adsorbing the condensible components on the core particles include:
1. Reduction in the formation of a film of condensible components on the aerosol, thus preventing the aerosol from acting as a carrier for malodorous components.
2. Controlled capture of the malodorous components in a film of condensible components, thus preventing the malodorous components from leaving the treated system with the emissions.
3. Reduction in the formation of a film of condensible components (which can interfere with the surface reactivity and interphase mass transfer of the malodorous components) on any interface in a subsequent multi-phase scrubber (e.g., a spray scrubber), thus increasing the efficiency of multi-phase scrubbing.

Municipal sewage treatment plants commonly use several different stages of treatment and produce several distinct types of malodorous emissions. FIGS. 3A to 3E are schematics showing the flows between various elements of typical municipal sewage treatment plants:
A primary sewage treatment
B secondary sewage treatment
C aerobic sludge digestion
D anaerobic sludge digestion
E sludge composting

A. PRIMARY SEWAGE TREATMENT

Figure 3A:
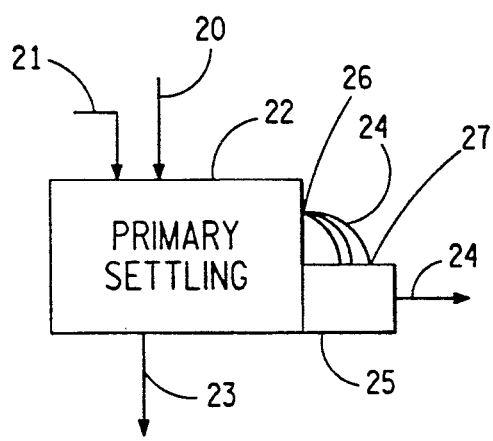
FIGS. 3A to 3E are block diagrams of the major stages of a municipal sewage treatment system.

As shown in FIG. 3A raw sewage 20 and recycled wastewater 21 are fed into one end of a long and very low-turbulence primary settling basin 22. The larger and heavier solids settle to the bottom, and a mechanical conveyor (not shown) scrapes them up to and out of the feed end of the primary settling basin 22 as primary sludge 23. At the discharge end of the primary settling basin 22 is a weir (not shown) over which the clarified primary liquid effluent 24 flows into a drain launder 25.

Malodorous sulfur compounds are formed in the primary settling basin 22. Because municipal sewage solids are very reactive toward oxygen and since the oxygen cannot be rapidly replenished in the absence of turbulence, the sewage in the tank becomes anaerobic. Micro-organisms in the untreated, settled solids gradually liberate hydrogen sulfide, organic sulfides (e.g., methyl mercaptan, dimethyl sulfide, dimethyl disulfide, etc.), and surface-active organics (e.g., organic acids, organic amines, phospholipids, etc.). Hydrogen sulfide is soluble in water under these conditions. The organic sulfides and organic acids are only slightly soluble and tend to accumulate as a film on the surface of the primary settling basin 22.

The primary liquid effluent 24 entrains air 26 as it flows over the weir and into the drain launder 25. When the air bubbles rise to the surface in the drain launder 25 and break, they create a primary gas/aerosol emission 27. The aerosol droplets have a water core and, if there is a film on the surface of the primary settling basin 22 the droplets become covered by a film of condensible components which may contain adsorbed, malodorous organic sulfides. This primary gas/aerosol mixture 27 will separate into a humid gas plume (2, FIG. 1) and an aerosol plume (3, FIG. 1) that may drift away from the system site and into the surrounding community, where it often causes odor complaints.

One conventional odor abatement treatment consists of adding to the raw sewage 20 and recycled wastewater 21 just sufficient ferric chloride solution to react with soluble sulfides or phosphates to form insoluble iron (III) sulfide or phosphate. This conventional treatment does not provide sufficient surface to significantly remove condensible components.

The process of the invention substantially reduces the odor of the aerosol plume (3, FIG. 1) by treating the raw sewage 20 and recycled wastewater 21 with an amount of ferric chloride that will generate a precipitate of hydrated iron (III) oxide in the intermediate pH range of 6–10 found in municipal sewage. The amount of ferric chloride added is typically 2 to 10 times the amount required to precipitate soluble sulfides in the raw sewage 20 and recycled wastewater 21. The core particles include hydrated iron (III) oxide, which will react with or adsorb the condensible components in the primary settling basin 22 to form a coating on the core particles. The core particles may be formed in the system in situ, for example, hydrated iron (III) oxide particles are precipitated by mixing an aqueous solution of ferric chloride, 1 to 30 percent by weight, and hydrochloric acid, 0.05 to 1 percent by weight, with an aqueous solution of sodium hydroxide, 0.05 to 50 percent by weight. The coated core particles are heavy enough to settle out, thus removing the condensible components from the primary liquid effluent 24 and preventing the formation of a film on the surface of the primary settling basin 22, so the breaking of bubbles in the drain launder 25 creates aerosol droplets that have no surface film of condensible components. Malodorous components cannot be adsorbed onto the film-free aerosol, so they are carried as vapors along with the humid gas plume (2, FIG. 1) to quickly disperse.

Another benefit of ferric chloride treatment is that a portion of the malodorous components, e.g., 1 to 10 percent by weight of the core particles, can be adsorbed in the surface film of iron (III) soaps on the hydrated iron (III) oxide and thus be removed with the core particles into the primary sludge 23 rather than being carried over the weir and into the drain launder 25 with the primary liquid effluent 24.

B. SECONDARY SEWAGE TREATMENT

Figure 3B:
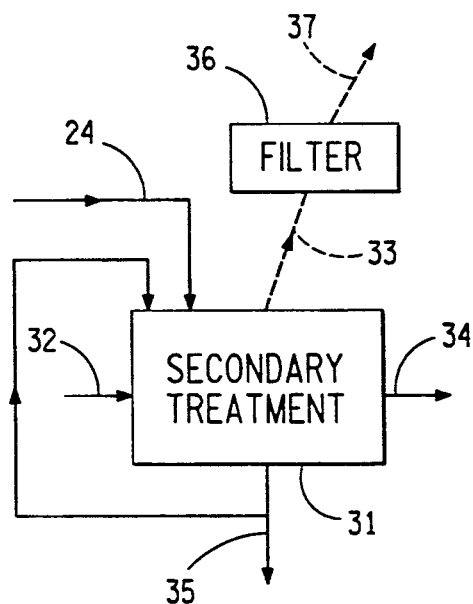
Figure 3C:
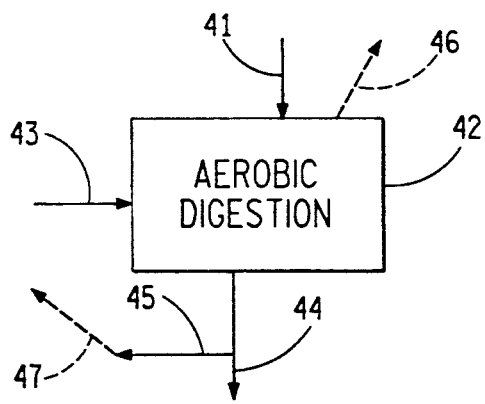
Figure 3D:
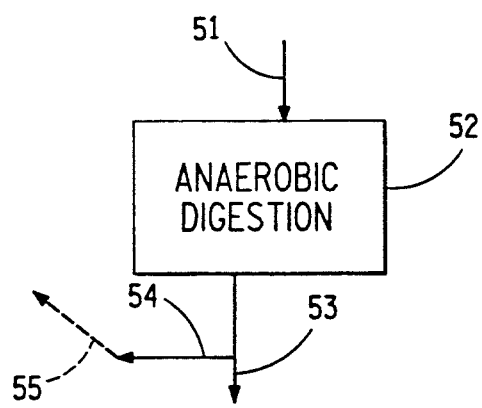
Figure 3E:
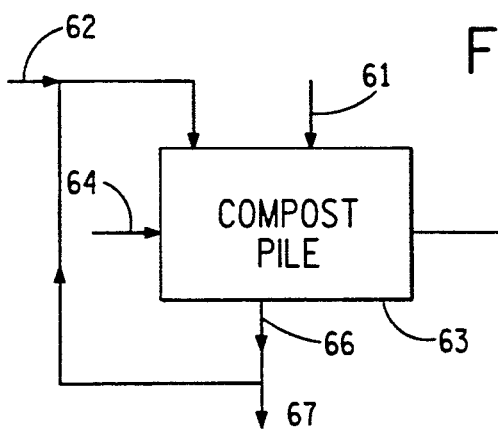
Figure 3E:
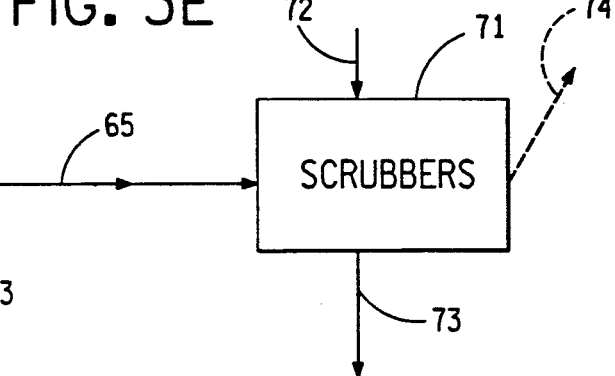

As shown in FIG. 3B primary liquid effluent (24, FIG. 3A) is fed into the secondary sewage treatment tank 31, and air 32 is bubbled through the mix of sludge and resident micro-organisms to promote rapid growth which incorporates the soluble nutrient components of the feed into the micro-organisms. The intense biological activity liberates malodorous organic sulfides and condensible compounds into the aeration bubbles. The droplets in the secondary gas/aerosol emission 33 are formed both by bubble breakup and by condensation of water vapor. Treated waste is separated into secondary wastewater 34, and secondary sludge 35, containing a high concentration of micro-organisms some of which is recycled to the secondary sewage treatment tank 31. The major portion of secondary wastewater 34 is discharged into the environment.

One conventional process for odor abatement passes the secondary gas/aerosol emission 33 through a packed filter bed 36, e.g., which conventionally contains dry, granular activated carbon. The discharge from the packed filter bed 36 is a cleaned secondary emission 37 The cleaned secondary emission 37 separates into a humid gas plume (2, FIG. 1) which disperses upwards and an aerosol plume (3, FIG. 1) which can move into the surrounding community with little dispersion, often leading to odor complaints. This conventional process can remove the malodorous components only if the secondary gas/aerosol emission 33 is heated to keep the relative humidity below 70% in order to prevent water vapor from condensing in and filling the adsorption pores in the activated carbon. Furthermore, disposal of or regeneration of the spent activated carbon is expensive.

The process of the invention substantially reduces the odor of the aerosol plume (3, FIG. 1) by passing the secondary gas/aerosol emission 33 through a packed bed filter 36 which contains the product from the reaction of a concentrated, acidic solution of ferric chloride with wood chips. The ferric chloride reacts with the tannic acids in the wood chips to precipitate core particles on the surface of the wood chips. The core particles in the secondary sewage treatment are the soap scum (consisting essentially of the precipitate of iron (III) with tannic acid coupling agent) adhering to the outside of the wood chips. The condensible components are adsorbed on the core particles by passing the secondary gas/aerosol emission 33 through a packed bed of these treated wood chips, so that the cleaned secondary emission 37 contains essentially no condensible components that could help carry malodorous components with the aerosol plume into the surrounding community. As a secondary benefit, some of the malodorous components are also removed by adsorption into the layer of condensible components entrapped on the core particles.

The process of the invention overcomes the disadvantages of activated carbon because the secondary gas/aerosol emission 33 need not be heated and the spent wood chips are inexpensive and biodegradable, so they need not be regenerated, but may be sent on to further treatment along with the secondary sludge 35.

C. AEROBIC DIGESTION OF SLUDGE

As shown in FIG. 3C either primary sludge (23, FIG. 3A) or secondary sludge (35, FIG. 3B) may be used as sludge feed 41 to pressurized aerobic digestion vessel 42. Air or oxygen 43 is then pumped in to maintain a rapid reaction rate. Treated waste is separated into aerobically digested sludge 44 containing most of the solids, and aerobic wastewater 45 which is recycled to he recycle waste water (21, FIG. 3A). Aerobic digestion also produces aerobic digestion gas 46 which can partially condense and separate into a humid gas plume (2, FIG. 1) and an aerosol plume (3, FIG. 1) of water droplets covered with a film of condensible components that permits adsorption of malodorous components, e.g., phenols, that are products of incomplete aerobic oxidation. An aerosol of this type drifting into the local community will lead to odor complaints. The process of the invention can be used to treat aerobic digestion gas 46 in the same manner as was used for secondary gas/aerosol emission 33.

Air bubbled through the aerobic wastewater 45 forms emission 47 which partially condenses and separates into a humid gas plume (2, FIG. 1) and an aerosol plume (3, the odor of the aerosol plume (3, FIG. 1) by treating the aerobic wastewater 45 with suspended core particles of the invention which are the product of mixing solutions of ferrous sulfate, alkali tannin, and hydrogen peroxide (Fenton's reaction). The peroxide oxidizes the hydrophilic phenol groups on the condensibles to hydrophobic quinone groups, the condensibles react with or adsorb on an substantially reduces the formation of a film of condensible components on the droplets in the emission 47 and thus prevents the adsorption of malodorous components onto the aerosol. When emission 47 separates into a humid gas plume (2, FIG. 1) and an aerosol plume (3, FIG. 1), the aerosol droplets contain substantially no adsorbed odor that could be carried into the nearby community. As a secondary benefit, malodorous components may be adsorbed into the iron (III)/tannic acid film present on the core particles, reducing the amount of malodorous components released into emission 47.

D. ANAEROBIC DIGESTION OF SLUDGE

As shown in FIG. 3D either primary sludge (23, FIG. 3A) or secondary sludge (35, FIG. 3B) may be used as sludge feed 51 to the pressurized anaerobic digestion vessel 52. Micro-organisms incorporate the nutrients in the feed and liberate malodorous amines, which are kept in solution as bicarbonates by the high partial pressure of carbon dioxide (a product of the anaerobic metabolism) in the pressurized anaerobic digestion vessel 52. Treated waste is separated into anaerobically digested sludge 53 and anaerobic wastewater 54 which is added to the recycle waste water (21, FIG. 3A). Subsequent handling of the anaerobic wastewater 54 at lower (atmospheric) pressure permits loss of carbon dioxide, accompanied by a rise in pH and the evaporation of malodorous amines which become part of the anaerobic gas/aerosol emission 55.

The process of the invention substantially reduces the odor of the aerosol plume (3, FIG. 1) by adding to the pressurized anaerobic digestion vessel 52 core particles of the invention which are the reaction product of a solution of ferric chloride with fatty acids and/or lecithin. Not only are malodorous soluble sulfides precipitated as insoluble iron (III) sulfides, but fatty acid and phosphatidyl choline are also precipitated as iron (III) soaps which adsorb malodorous amines and retain them in the anaerobic wastewater 54 rather than permitting them to be liberated with the anaerobic gas/aerosol 55 when the pressure on the anaerobic wastewater 54 is released.

E. SLUDGE COMPOSTING

As shown in FIG. 3E either primary sludge (23, FIG. 3A) or secondary sludge (35, FIG. 3B) or aerobically digested sludge (44, FIG. 3C) or anaerobically digested sludge (53, FIG. 3D) can be used as sludge feed 61 which is mixed with carbon amendment 62 (typically wood chips or sawdust) and heaped into a compost pile 63. Air 64 is drawn through the compost pile 63 to promote aerobic decomposition of the sludge. Vapors from the materials in the pile are carried off with the raw compost emission air 65 which normally contains ammonia, along with malodorous organic sulfides and terpenoid phenolics. The compost mixture 66 is screened, if desired, to separate the carbon amendment 62 for recycling to a new compost pile 63. The screened compost 67 can then be cured and sold as a soil conditioning agent.

Conventional odor abatement treatment passes the raw compost emission air 65 through one or more scrubbers 71 in which fresh scrubbant 72 is sprayed through and picks up components from the raw compost emission air 65, then is discharged as spent scrubbant 73. The gas/aerosol mixture exiting from the one or more scrubbers 71 is processed compost emission 74. The spent scrubbant 73 is added to the recycle wastewater (21, FIG. 3A).

In one conventional odor abatement process, the first scrubber uses a spray of sulfuric acid to remove the ammonia and malodorous organic amines and a second scrubber uses a spray of bleach (sodium hypochlorite) to remove malodorous organic sulfides and produce a processed compost emission 74. Phenolics in the raw compost emission air 65 interfere with sulfuric acid scrubbing and can react with bleach to form malodorous phenolic derivatives that exit with the processed compost emission 74. Unscrubbed ammonia in the air exiting the first scrubber interferes with bleach scrubbing to control organic sulfides, and also reacts with the bleach to form malodorous amine derivatives that exit with the processed compost emission 74.

The process of the invention substantially reduces the odor of the aerosol plume (3, FIG. 1) by passing the raw compost emission air 65 through a first scrubber using a spray of dilute aqueous acidified reactive colloid, e.g., corn syrup (dextrose, maltose, and dextrin), and through a second scrubber using a spray of dilute aqueous alkaline hydrogen peroxide. The core particles of the invention are dextrin particles, which can adsorb the reaction products of dextrose with phenolics, terpenoids or other condensible components. Thus the malodorous components are not carried by the aerosol plume (3, FIG. 1) going into the community.

As a secondary benefit the absorbed film can absorb malodorous components from the raw compost emission air 65 resulting in a processed compost emission 74 which is additionally de-odorized. Another benefit is that treatment with the acidified solution of corn syrup causes hydrophobic phenolics (which would otherwise interfere with ammonia adsorption) to react with dextrose to form hydrophilic oligomers, which are adsorbed away from the interface onto hydrophilic, colloidal dextrin, thereby optimizing ammonia capture. Still another benefit is that since terpenoids are removed in the first scrubber, alkaline hydrogen peroxide can be used in the second scrubber instead of bleach for oxidizing organic sulfides, thus preventing the formation of malodorous chlorine derivatives from residual terpenoids or ammonia.

DISCUSSION OF EQUIVALENTS

Human observers generally describe odors in terms of everyday materials or operations (as is done for textures s done for colors and music). Typical terms used for nuisance odors arising from municipal sewage treatment would include ammonia, diaper pail, rotten eggs, rotten cabbage, etc.

The odor threshold concentrations of many compounds are listed in the "Handbook of Environmental Data on Organic Compounds", 2nd ed. by Karel Verscheuren, Van Nostrand Reinhold, 1983. The concentration at which an odor becomes a nuisance to an observer varies with the sensitivity of the observer to the odor, the humidity, the temperature, and the concentrations of other solid, liquid, and gaseous materials in the mixture that is inhaled. Some of the volatile, malodorous components that cause odor complaints are:

Hydrogen sulfide (rotten egg odor): This gas is acidic and can be adsorbed by a scrubbing solution with a high pH. Hydrogen sulfide evolves from anaerobic sewage treatment at a low pH.

Ammonia (penetrating ammonia odor): This gas is basic and can be adsorbed by a scrubbing solution with a low pH. Ammonia reacts with moist hydrogen sulfide to form a nonvolatile product, so both cannot be present at the same time in one gas stream. Ammonia evolves from aerobic sewage treatment at a high pH.

Organic Mercaptans, e.g., methyl mercaptan, etc. (sewage sludge odor)

Dimethyl Sulfide (dead animal odor)

Dimethyl Disulfide (rotten cabbage odor): An oxidation product of methyl mercaptan.

For conventional scrubbing purposes, odors fall into four categories:

Acid-soluble: ammonia, organic, e.g., aliphatic amines, pyridine, skatole, etc.

Base-soluble: hydrogen sulfide, aliphatic acids, phenolics, etc.

Oxidizable: dimethyl disulfide, alkyl sulfides, terpenes, etc.

Adsorbable: phenolics, such as eugenol, arising from oxidation of proteins, etc.

Many condensible, hydrophobic relatively nonmalodorous components are present during at least one stage of municipal sewage treatment operations: edible oils, animal fats, free fatty acids, greases, terpenes, waxes, hydrocarbons, bases, e.g., cholines, etc.

The odor-emitting system, i.e. sewage, is reacted with the core particles, which can be formed externally to the treatment stage or can be formed in situ by adding the reactants to the system.

The core particles can have various shapes, e.g., colloidal particles, platelets, fibers, films, etc. The cores may be coated onto a substrate or agglomerated into granules, fabrics, or films, provided that the pores formed during agglomeration have a pore-volume-average diameter comparable to or larger than the volume-average minimum dimension of the core particles. The mass-average minimum dimension for the core particles is between 0.01 and 10 micrometers, preferably 0.05 and 1 micrometer. The minimum dimension can be determined as described in T. Allen "Particle Size Measurement", Chapman and Hall, London, England, 3rd Edition, 1981.

The external surface expressed in square meters per gram may be computed from the particle shape and particle size distribution as determined from ultracentrifuge sedimentation, electron microscopy, electrosensing zone counting, or light scattering. The core particles have an external surface area of 1 to 400 $m^2/g$, preferably 10 to 40 $m^2/g$.

The surface of the core particles may be treated with a coupling agent to increase its reactivity or adsorptivity toward the condensible components by providing an electrical charge or chemical functionality that enhances adsorption. Increased reactivity or adsorptivity may also be accomplished by chemically treating the surface or adjusting the liquid phase environment in which the particle is suspended.

The core particles may have a high magnetic susceptibility so that spent adsorbent can be readily removed from the system by attraction to a magnet.

The amount of core particles required for treatment varies depending on the particular step of the treatment, the condensible components that are to be removed, and the specific core particle type that is used. Generally the core particles are used in the range of 10 to 100 milligrams per liter of sewage in a sewage treatment system.

Preferably the core particles are present in an amount comparable to the weight of condensible components. The amount of core particles added is typically two to ten times the amount required to precipitate soluble sulfides, if present.

Suitable core particles include:

Inorganic solid materials, e.g., metal oxides, including those with various fractions of metal hydroxide present or various degrees of hydration, e.g., fresh or aged precipitates of iron (III) hydroxide, aluminum hydroxide, zirconium oxide, manganese (IV) oxide, silica, insoluble metal sulfides, e.g., iron sulfide, copper sulfide, zinc sulfide, etc; metal sulfates, e.g., calcium sulfate, barium sulfate; and metal phosphates, e.g., aluminum phosphate, iron phosphate, etc. Some particles (e.g., chromium (III) hydroxide) which are effective are not preferred because they may be classified as hazardous materials. Other particles (e.g., hydrated iron (II) oxide such as from pickle liquor) which are effective are not preferred because they are so soluble that the cost of adding enough reagent to produce a precipitate would be prohibitive. Salts of the foregoing metals can be used, including, but not limited to, chlorides, sulfates, acetates, and bicarbonates.

Organic solids, preferably with cyclic structures such as starch, dextrin, cellulose and its derivatives; metal precipitates of soluble lignins and tannins, polymers, e.g., cellulose acetate, polyesters, e.g., polyethylene terephthalate; poly(vinyl esters), polyamides, polydiphenyl ethers, etc.

Preferred core particles include those formed from iron chloride.

The reactivity or adsorptivity of the core particles may be enhanced by various means, e.g., adjusting the pH of the liquid phase environment in which the particle is suspended, e.g., 1 to 14, preferably, in the pH range of 3 to 12; applying a coupling agent to the particles, chemically treating the surface with oxidizing agents, e.g., hydrogen peroxide, etc. or reducing agents, etc.

The coupling agent can be used in an amount of 10 to 1000 milligrams per gram of core particles. Coupling agents that are useful in conjunction with core particles include rosin, tannic acid, aspirin, lecithin, odorless soaps, monosodium glutamate, urea, sucrose, dextrose, glucose, soluble starch, pyrogallol, organic zirconates, titanates, silanes, etc. Phenolic vapors can react with soluble aldehydes, e.g., glucose in corn syrup. Aldehyde vapors can react with soluble amines, e.g., monosodium glutamate. A preferred coupling agent is pine oil, particularly heavy pine oil which is a mixture of terpineol, isoborneal, and fenchol. Especially preferred is pine oil having a boiling point of about 190°-220° C.

A preferred system is using the process of this invention with core particles formed from iron chloride (i.e., precipitates of iron III hydroxides and with a coupling agent which is pine oil.

Other coupling agents include:

terpene alcohols such as terpineol (e.g., citrus peel oil), menthol (oil of mint);

terpene hemihydroquinones such as isoborneol and fenchol (in pine oil);

phenol derivatives, e.g., salicylic acid, vanillin, thymol (oil of thyme);

terpene ethers such as cineole (oil of eucalyptus), estragole (oil of tarragon);

anionic soaps of fatty acids, e.g., from animal fat, vegetable oil, tall oil;

amphoteric soaps, e.g., of phosphates (lecithin), amino acids (phenylalanine);

cationic soaps of fatty alcohols, e.g., lauryl alcohol (coconut), lanolin (wool); and cationic salts of quaternary amines, e.g., choline/ethanolamine (lechithin).

It has been found that the process of this invention can substantially reduce hydrogen sulfide emissions from aqueous media containing decaying or fermenting organic material. For example, the process of this invention can substantially reduce the amount of hydrogen sulfide emitted from sewage, waste water, and industrial waste such as effluent from paper mills. Furthermore, the process of this invention, when used in conjunction with a suitable coupling agent, can substantially reduce the amount of hydrogen sulfide emitted from an odor emitting system over a period of many hours. Previously, reducing hydrogen sulfide emissions over such longer periods has been a substantial problem.

INDUSTRIAL APPLICABILITY

The process of the invention is useful for controlling and reducing perceived emitted odors. It has been found particularly useful in treatment of sewage including primary and secondary sewage treatments, aerobic digestion and anaerobic digestion of sludge, and in sludge composting. The core particles, a vital ingredient, can be formed by chemical reaction prior to addition to a step of sewage treatment or by reaction or precipitation in situ in the sewage liquid. Other systems in which the process is useful include industrial sources of condensible organics, e.g., oxidation, hydrogenation, sulfonation, chlorination, digestion, etc.

The present invention may also reduce the degree to which malodorous components need to be removed from a humid gas/aerosol emission by other treatment processes in order to reduce odor complaints to a given level. For example, in some previous processes 99.99 percent by weight of the malodorous components had to be removed from the emission to ensure that there were few odor complaints from the surrounding community. By this invention the condensible components that are capable of coating the aerosol are removed by adsorbing on the core particles, thus permitting the malodorous components, which cannot now be adsorbed on the aerosol, to dissipate with the gas plume at high altitudes. If, for example, after the present process is used only 99% of the malodorous component needs to be removed to reduce the odor complaints to the same degree, then the required efficiency of the removal has been reduced by 100-fold. Thus, the investment cost of the cleaning treatment can be materially reduced by incorporating the process of the invention in the treatment operation.

EXAMPLES

The following examples illustrate, but do not limit, the invention. The percentages are by weight, parts per million (ppm) are by volume for gases and by weight for liquids and solids. In the examples the following analytical equipment was used:

Draeger tubes, Draegerwerk, Luebeck, Federal Republic of Germany, are designed to respond to specific classes of gases: hydrogen sulfide, model 671900; dimethyl sulfide, model 672845; mercaptan, model CH 20801.

Sampling for gas chromatography: Gas samples were drawn through an ice-cooled impinger, Ace Glass, Vineland, NJ, following methods S008 and S012 as detailed in "Sampling and Analysis Methods for Hazardous Waste Combustion" PB84-155845, NTIS, Feb. 1984 to reduce the water vapor concentration to a level acceptable for the gas chromatograph. The gas was then passed through a Volatile Organic Sampling Train (VOST tube) that adsorbs vapors in a packing containing both activated carbon and a polymer of diphenyl ether as described in Appendix F of the NTIS Report cited above. The vapors are later evaporated into a small volume of helium by a controlled heating of the VOST adsorption tube.

The hot, vapor-loaded helium is injected into a Tracor Model 540 Gas Chromatograph, Tracor Corp., Austin, TX, and eluted with a stream of helium through an uncoated capillary tube in a temperature-controlled oven. The components of the vapor mixture migrate down the column at speeds related to their volatility, with low-boilers having the shortest retention time in the column. To hasten the analysis, the temperature of the column is raised from an initial value of 80° to 250° C. over a 30 minute period. Gases exiting the column pass through both FID and FPD analyzers to quantify the amount of hydrocarbon (FID) or sulfur (FPD) in each peak eluted from the column.

The FID (flame ionization detector) responds to all the hydrocarbon in a sample, but does not differentiate between malodorous and nonodorous or volatile and condensible components. It does not respond well to ammonia or hydrogen sulfide.

The FPD (flame photometric detector) responds to sulfur compounds, which are usually malodorous and volatile.

A PID (photoionization detector) H-NU, Model PI-101, Newton Highlands, MA, responds to easy-to-ionize materials, many of which are condensible components, so it is used to determine whether condensible components are being removed.

EXAMPLE 1

A portion of the raw sewage (roughly 50% domestic, 50% industrial) entering a municipal sewage treatment plant was split to flow into four primary settling basins. The stream flowing into each basin was about 4,400 gallon per minute and of comparable composition. Two of the basins were treated by adding to their feed streams 1.5 gallons per minute of an aqueous solution containing 30 percent ferric chloride with less than 1 percent hydrogen chloride, and 0.5 gallon per minute of an aqueous solution of 50 mass percent sodium hydroxide. This treatment corresponds to roughly 50 milligrams of ferric chloride per liter of sewage.

A precipitate was observed to form from the reaction of ferric chloride solution with the sewage. The final pH was between 6.0 and 7.0. The core particles were precipitated hydrated iron (III) oxide. The condensible components were the organic fatty acids, such as oleic acid, that react with the surface of the hydrated iron (III) oxide. The coating of condensible component adsorbed dimethyl disulfide, which was a malodorous component.

Gas was bubbled through the sewage at the discharge end of the primary settling basin and the resulting test gas was drawn through Draeger tubes to analyze for several types of gas. During a ten day test, five sets of gas samples were analyzed. The dimethyl sulfide Draeger tube readings in the test gas typically dropped from 2 parts per million for the untreated control to 0.5 ppm for the treated sample. The Draeger tube readings for organic mercaptans typically dropped from 12 ppm for the untreated control to 1.2 ppm for the treated sample. The Draeger tube readings for hydrogen sulfide typically dropped from 2.8 ppm for the untreated control to 0.6 ppm for the sample. An odor panel of site personnel reported that the test gas from the treated effluent required only 40-fold dilution to get below the odor threshold compared to 180-fold dilution for the untreated control effluent.

EXAMPLE 2

Secondary wastewater in a municipal treatment plant was treated by means of rotating biological contractors, each of which consists of a dome containing multiple plastic plates on a shaft which rotates partially submerged in aerated wastewater. The spent aeration air had a foul smell like garlicky sludge, and had a typical concentration of 13 ppm condensibles as measured by PID. A 43 liter/minute sample of spent aeration air was pulled through a sidestream test packed filter bed mounted in a standard personnel respirator cartridge housing. Test packing is described below. Treated air had a fresh smell like hardwood sawdust, and had a typical concentration of 4 ppm condensibles as measured by PID. Test air treatment was discontinued after passage of over a million bed volumes without any noticeable deterioration in performance.

Test packing was made by sawing a kiln dried pine board with a crosscut hand saw to obtain coarse sawdust, then sieving to remove fines smaller than 1 millimeter. Sawdust coarser than 1 millimeter was soaked in a slight volumetric excess of 30 percent by weight aqueous solution containing ferric chloride with less than 1 percent hydrogen chloride, then dried to constant weight at 105° C. The product turned black on drying and looked like granular activated carbon.

Core particles were hydrated iron (III) oxide precipitated on the sawdust surface and activated by reaction with soluble tannins from the sawdust as coupling agents. Process condensibles behaved as phenolics which tend to hydrolyze under these acidic conditions and be effectively captured by the coated particles.

EXAMPLE 3

Mixed primary and secondary thickened sludges in a municipal treatment plant were conditioned by Zimmerman process partial wet oxidation prior to dewatering. The Zimmerman process (Zimpro) is described in "Physicochemical Processes For Water Quality Control," W. J. Weber, Jr., Wiley-Interscience, New York, New York, 1972, page 550, 582-584. Of the typical three percent suspended solids in wet oxidation feed, about one-third oxidizes, one-third dissolves, and one-third is left as conditioned solids. The product slurry was thickened and filtered to generate a 50% solids filter cake which was incinerated and hot clarified "Zimtrate" solution which was recycled back to the plant feedwell at about 1 percent by volume of the plant flow, i.e., 100/1 dilution. "Zimtrate" has a nauseating smell like burnt chocolate and requires about 10,000 fold dilution with water to get below the odor threshold.

Samples of "Zimtrate" of typical chemical oxygen demand 10,000 milligram/liter were treated by Fenton oxidation with 200 milligrams/liter hydrogen peroxide in the presence of ferrous tannate particles prepared by precipitating 900 milligrams/liter ferrous sulfate in situ with 100 milligrams/liter tannic acid from beverage teabags and adjusting the pH to between 6.5 and 7.5 prior to oxidation. Treated "Zimtrate" had a mild residual odor and required only about 100 fold dilution with water to get below the odor threshold.

Core particles were hydrated iron (III) oxide activated by coating with tannic acid as a coupling agent. Process condensibles behaved as phenolics with an isoelectric pH near 8 similar to that of uncoated hydrated iron (III) oxide. Use of a coupling agent such as tannic acid with a much lower isoelectric pH permits coated particles to behave anionically and capture cationic condensibles more effectively. Comparable results were obtained from two other treatments, i.e., using similar concentrations of particles prepared from ferrous chloride and hydrogen peroxide, or from potassium permanganate.

EXAMPLE 4

A sample of anaerobically-digested sludge (1.89 mass percent solids) from a municipal sewage treatment facility was taken to the laboratory and split into two parts. One part was treated at a level of 1000 parts per million ferric chloride and 50 parts per million tannic acid (extracted from commercial tea) and the pH adjusted to 6.4 with dilute sodium hydroxide.

The core particles were hydrated iron (III) oxide activated by a coupling agent (tannic acid that reacts with the surface of the hydrated iron (III) oxide).

The PID scale reading indicative of condensible components in the head-space dropped from 124 to 34 in the treated sample. The odor of the head-space gas over the treated sample was substantially less objectionable than the odor for the untreated control. Chemical analysis showed that dissolved sulfides dropped from 1.9 parts per million in the untreated control to 0.7 parts per million for the treated sample. The scale reading for volatile organic carbon (as measured by FID) in the headspace gas dropped from 300 parts per million to 100 parts per million in the treated sample.

EXAMPLE 5

A 10 liters per minute side-stream of raw compost emission air from a municipal sludge composting facility (treating sewage sludge mixed with sawdust) was passed through three tipless Greenburg-Smith impingers, each of which contained 0.2 liter of liquid at 27° C. The first impinger contained an aqueous solution of 20 grams per liter of commercial corn syrup acidified to pH 3 using sulfuric acid. The second impinger was empty to simulate interconnecting ductwork in the full-scale facility. The third impinger contained an aqueous solution of 1.5 grams hydrogen peroxide per liter adjusted to pH 8 using sodium hydroxide.

The core particles were dextrin particles from the corn syrup. Reaction products of phenolic (condensible) components with glucose from the corn syrup adsorbed onto the core particles. Some of the volatile and malodorous organic hydrocarbons were also adsorbed in the adsorbed film.

For the control run, in which the first impinger contained only water at pH 3, the air discharged from the scrubbing train had a strong sludge odor. With the corn syrup present, the discharge had a sweet, mild sludge odor.

EXAMPLE 6

A 10 liters per minute side stream of raw compost emission air from a municipal sludge composting facility was passed through three impingers at 55° C. The first impinger contained 0.2 liter of an aqueous solution containing 25 milligrams/liter of a commercial odorless liquid detergent adjusted to pH 3 with sulfuric acid. The second impinger contained 0.2 liter of an aqueous solution containing 3.3% sodium hypochlorite and adjusted to pH 8.7. The third impinger contained 0.2 liter of an aqueous solution containing 0.5% hydrogen peroxide and adjusted to pH 2.8 with sulfuric acid.

The core particles were hydrated silica from the detergent. The coupling agent was detergent ingredients that adsorbed on the solids. The activated core particles then entrapped the condensible components and some of the volatile malodorous components.

The treated air discharged from the impinger train was trapped in VOST tubes and later analyzed by gas chromatography. The integrated gas chromatography chart area for condensible components (those whose peaks had retention times greater than 10 minutes) dropped from 227 arbitrary units with no detergent treatment to 154 with treatment. The equivalent full scale system using this treatment experienced a 90% decrease in odor complaints from the community compared to previous years.

EXAMPLE 7

Dewatered mixed primary and secondary sludges were composted in a vessel using sawdust as carbon amendment. Raw compost emission air was discharged at 55° C. through stacks. A 10 liters/minute sidestream of raw compost emission air was passed through three impingers at 55° C. The first and third impingers contained 0.2 liter of 150 milligrams/liter ferrous chloride and 150 milligrams/liter of ferric chloride, plus 10 milligrams/liter of odorless fatty acid liquid soap. The second impinger was empty. The untreated gas had an unpleasant odor like earthy sludge and required over 300 fold dilution with air to get below the odor threshold. Treated gas had a very mild residual odor like topsoil and required less than 100 fold dilution with air to get below the odor threshold. Comparable result were obtained using similar concentrations of "liquid tree" sodium lignosulfite from a neutral sulfite semichemical hardwood pulp mill instead of liquid soap.

Core particles were hydrated iron (II, III) oxides activated by coating with saponified acids from the liquid soap or from "liquid tree" sodium lignosulfite. Process condensibles behaved like cationic phenolics which were effectively captured by core particles activated by saponified acid anionic coupling agents.

EXAMPLE 8

In a kraft paper mill, bleachery washwater is anaerobically digested, and the solubles returned to primary treatment along with wastewater from the rest of the plant. The wastewater passing through primary treatment is rich in soluble sodium and ammonium sulfides, which are held in solution only by the buffering effect of soluble alkalis such as soda from brown stock washing and ammonia from anaerobic digestion. The solution is also rich in putrescible "liquid tree" components arising from the pulp digestion process. The superficial residence time of liquid in the primary clarifier is six hours. Some of the liquid overflowing to a common channel called a splitter box for subsequent secondary treatment is in contact with living sludge settling out in the primary digester. The sludge is undergoing anaerobic biological fermentation, the net effect of which is to generate acids which consume buffer alkalinity and convert sulfide from soluble ionic form to dissolved gaseous hydrogen sulfide, which strips out at the splitter box, causing a safety and odor problem.

A 30% ferric chloride solution at an average dose rate of 80 milligrams of $FeCl_3$ per liter of wastewater was added to the treatment facility after the aerobic wastewater mixes with the anaerobic wastewater. The $FeCl_3$ immediately and completely mixed with the wastewaters because of the high turbulence at this location. Gas samples were taken at the splitter box and immediately analyzed for sulfur-containing compounds on an AID portable gas chromatograph. Six hours after this treatment, $H_2S$ concentration was found to average 35 parts per million by volume. Without $FeCl_3$ treatment, the $H_2S$ concentration at this location averaged 125 parts per million by volume, as measured by the same instrument.

A mixture of about 95% heavy pine oil and 5% glacial acetic acid, to which about 2% pine tar was added, was fed to the wastewater along with the $FeCl_3$. (The function of glacial acetic acid and pine tar was to control the dispersibility of the pine oil in the wastewater.) The ratio of pine oil mixture to $FeCl_3$ solution was about 1 to 100. Six hours after this treatment, a gas sample was analyzed at the same location, and the average $H_2S$ concentration was found to be less than 5 parts per million by volume, the limit of detection of the gas chromatograph.

I claim:

1. A process for substantially reducing the odor perceived by the community of an aerosol plume emitted from an odor-emitting system, the system having malodorous, low-boiling, hydrophobic components and relatively nonmalodorous, high-boiling, condensible, hydrophobic components, hydrogen sulfide, and water, the process comprising:
   (a) contacting the relatively nonmalodorous, high-boiling, condensible, hydrophobic components of the water-containing odor-emitting system with effective amounts of water insoluble core particles reactive with or adsorptive to the relatively nonmalodorous, high-boiling, condensible, hydrophobic components,
   said particles having substantially all their surfaces exposed on the exterior of the particles, whereby the relatively nonmalodorous, high-boiling, condensible, hydrophobic components react with or are adsorbed to the core particles forming a coating thereon, thus substantially preventing the formation on the aerosol of a film of the relatively nonmalodorous, high-boiling, condensible, hydrophobic components which would entrap the malodorous, low-boiling, hydrophobic components on said aerosol,
   (b) preventing the relatively nonmalodorous, high-boiling, condensible, hydrophobic components from being carried into the community with said aerosol plume, and
   (c) dispersing residual malodorous, low-boiling, hydrophobic components into the atmosphere,
   wherein the reactivity or adsorptivity of the core particles is enhanced by applying a coupling agent comprising pine oil to the particles, and wherein the amount of hydrogen sulfide emitted from the system is reduced.

2. The process of claim 1, wherein the core particles are hydrated iron (III) oxide.

3. The process of claim 1 wherein the pine oil has a boiling point of about 190°–220° C.

4. The process of claim 1 wherein the core particles are hydrated iron (III) oxide and the pine oil has a boiling point of about 190°–220° C.

5. The process of any one of claims 1, 2, 3 or 4 wherein the core particles are present in an amount of 10–100 milligrams per liter of sewage or wastewater which emits odors, and the coupling agent is present in an amount of about 10–1000 milligrams per gram of core particles.

* * * * *